(12) United States Patent
Kashiwagi et al.

(10) Patent No.: US 10,532,944 B2
(45) Date of Patent: Jan. 14, 2020

(54) SOOT DEPOSITION BODY MANUFACTURING APPARATUS AND MANUFACTURING METHOD

(71) Applicant: Shin-Etsu Chemical Co., Ltd., Tokyo (JP)

(72) Inventors: Yusuke Kashiwagi, Ibaraki (JP); Tetsuya Otosaka, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 109 days.

(21) Appl. No.: 15/681,432

(22) Filed: Aug. 21, 2017

(65) Prior Publication Data

US 2018/0050950 A1 Feb. 22, 2018

(30) Foreign Application Priority Data

Aug. 22, 2016 (JP) ................................ 2016-161706

(51) Int. Cl.
*C03B 20/00* (2006.01)
*C03B 19/14* (2006.01)
(Continued)

(52) U.S. Cl.
CPC ...... *C03B 37/0142* (2013.01); *C03B 2207/12* (2013.01); *C03B 2207/52* (2013.01)

(58) Field of Classification Search
CPC . C03B 37/00; C03B 19/1407; C03B 19/1415; C03B 19/143; C03B 19/1484;
(Continued)

(56) References Cited

U.S. PATENT DOCUMENTS 5,183,490 A * 2/1993 Mikami ............... C03B 37/014
65/144
6,698,249 B1 * 3/2004 Yagi .................. C03B 37/01406
65/414
(Continued)

FOREIGN PATENT DOCUMENTS

| JP | H0489321 A | 3/1992 |
|---|---|---|
| JP | 2003-165738 A | 6/2003 |
| JP | 2007137718 A | 6/2007 |

OTHER PUBLICATIONS

Office Action issued for counterpart Japanese Application No. 2016-161706, drafted by the Japan Patent Office dated Jul. 26, 2019.

*Primary Examiner* — Cynthia Szewczyk

(57) ABSTRACT

In order to improve the yield of an optical fiber base material, provided is a manufacturing apparatus for manufacturing an optical fiber base material by forming a soot deposition body on a surface of a target rod, including a main burner that generates glass microparticles to be deposited on the target rod while moving in a longitudinal direction of the target rod; a pair of side burners that are arranged outside a movement range of the main burner and heat both ends of the soot deposition body formed on the surface of the target rod; and a shielding member that prevents the glass microparticles generated by the main burner from being deposited on the target rod farther outward than a segment of the target rod sandwiched by the pair of side burners.

13 Claims, 10 Drawing Sheets

(51) Int. Cl.
*C03B 37/014* (2006.01)
*C03B 37/018* (2006.01)

(58) Field of Classification Search
CPC . C03B 20/00; C03B 37/014; C03B 37/01406; C03B 37/01413; C03B 37/0148; C03B 37/01486; C03B 37/01815; C03B 37/01823; C03B 37/01884; C03B 37/01876
See application file for complete search history.

(56) References Cited

U.S. PATENT DOCUMENTS

| | | | |
|---|---|---|---|
| 2004/0060326 A1* | 4/2004 | Ishihara | C03B 37/01406 65/414 |
| 2008/0087048 A1* | 4/2008 | Takei | C03B 37/01406 65/531 |

* cited by examiner

SOOT DEPOSITION BODY MANUFACTURING APPARATUS AND MANUFACTURING METHOD

The contents of the following patent Japanese application are incorporated herein by reference:

Japanese Patent Application NO. 2016-161706 filed on Aug. 22, 2016.

BACKGROUND

1. Technical Field

The present invention relates to a soot deposition body manufacturing apparatus and manufacturing method.

2. Related Art

There is technology for, when forming a soot deposition body through an optical fiber base material manufacturing process, preventing the soot pealing by which a portion of the soot deposition body peels away by arranging side burners near the ends of the deposition body and firing the soot deposition body at these portions, as shown in Patent Document 1, for example.

Patent Document 1: Japanese Patent Application Publication No. 2003-165738

There are cases where a low-density soot deposition body, which is a cause of soot peeling, is formed on the target rod farther outward than the segment sandwiched by the side burners.

SUMMARY

According to a first aspect of the present invention, provided is a manufacturing apparatus for manufacturing an optical fiber base material by forming a soot deposition body on a surface of a target rod, comprising a main burner that generates glass microparticles to be deposited on the target rod while moving in a longitudinal direction of the target rod; a pair of side burners that are arranged outside a movement range of the main burner and heat both ends of the soot deposition body formed on the surface of the target rod; and a shielding member that prevents the glass microparticles generated by the main burner from being deposited on the target rod farther outward than a segment of the target rod sandwiched by the pair of side burners.

According to a second aspect of the present invention, provided is a manufacturing method for manufacturing an optical fiber base material by forming a soot deposition body on a surface of a target rod, comprising depositing glass microparticles on the target rod by moving a main burner that generates the glass microparticles in a longitudinal direction of the target rod; heating both ends of the soot deposition body formed on the surface of the target rod with a pair of side burners that are arranged outside a movement range of the main burner; and preventing, with a shielding member, the glass microparticles generated by the main burner from being deposited on the target rod farther outward than a segment of the target rod sandwiched by the pair of side burners.

According to a third aspect of the present invention, provided is a shielding member that is arranged in a manufacturing apparatus, which is for manufacturing optical fiber base material by forming a soot deposition body on a surface of a target rod, outside of a movement range of a main burner that generates glass microparticles to be deposited on the target rod and between a pair of side burners that heat both ends of the soot deposition body formed on the surface of the target rod, the shielding member preventing the glass microparticles generated by the main burner from being deposited on the target rod farther outward than a segment of the target rod sandwiched by the pair of side burners.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
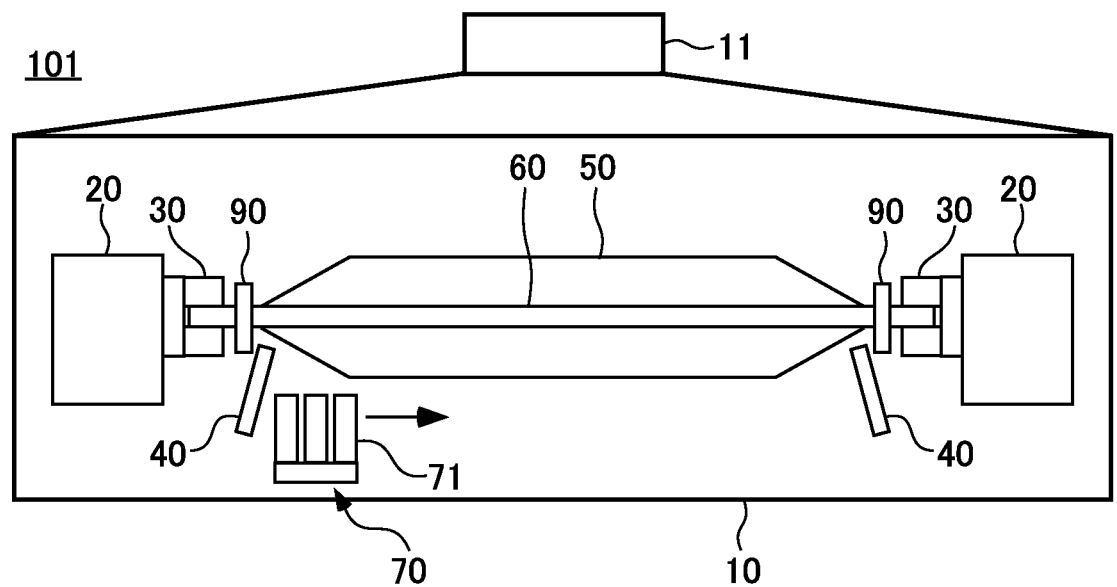
FIG. 1 is a schematic vertical cross-sectional view of the manufacturing apparatus 101.

FIG. 1 is a schematic vertical cross-sectional view of an exemplary manufacturing apparatus 101 for manufacturing a soot deposition body. The manufacturing apparatus 101 includes a chamber 10, rotating mechanisms 20, chucks 30, side burners 40, and a main burner 70. The chamber 10 includes an exhaust outlet 11 and supply holes, which are not shown in the drawings, and the soot deposition body 50 is manufactured while the chamber 10 is continuously supplied with an inert gas such as nitrogen gas and expels exhaust that contains glass microparticles or the like that were not deposited.

A rotating mechanism 20 and a chuck 30 are arranged near each longitudinal end inside the chamber 10. Each chuck in the pair of chucks is supported to be rotatable relative to the chamber 10, and the chucks 30 grip the target rod 60 at both ends. The rotating mechanisms 20 respectively rotate the chucks 30 to rotate the target rod 60 gripped by the chucks 30.

The main burner 70 includes three deposition burners 71 and, when supplied with a raw material gas such as $SiCl_4$, along with $H_2$, $O_2$, and $N_2$ gases, for example, generates glass microparticles through a hydrolytic reaction. Furthermore, the main burner 70 moves parallel to the extension direction of the target rod 60 while generating the glass microparticles. Therefore, the main burner 70 deposits the glass microparticles over a wide range in the longitudinal direction of the target rod 60 to form the soot deposition body 50 on the surface of the target rod 60. In this way, in the manufacturing apparatus 101, the soot deposition body 50 is formed through outside vapor deposition. The formed soot deposition body 50 is made transparent through sintering, and becomes a cladding layer.

In the manufacturing apparatus 101, the side burners 40 are arranged at respective ends of the movement range of the main burner 70, outside of the segment sandwiched by the pair of side burners 40. Each side burner 40 heats a region near an end of the soot deposition body 50 formed on the target rod 60, separately from the main burner 70. In this way, both end portions of the soot deposition body 50 are fired to have increased density, and soot peeling is prevented. Furthermore, by having the side burners 40 emit the flames at both ends of the soot deposition body 50, the glass microparticles generated by the main burner 70 are prevented from being deposited on the target rod 60 farther outward than the segment sandwiched by the side burners 40.

It should be noted that when the main burner 70 reaches an end portion of the movement range, there are cases where a portion of the glass microparticles generated from the main burner 70 are deposited on the target rod 60 farther outward than the segment sandwiched by the side burners 40. However, in the manufacturing apparatus 101 shown in the drawing, the glass microparticles that move farther outward than the side burners 40 are prevented from attaching to the target rod 60 by the shielding member 90.

In other words, in the manufacturing apparatus 101, a pair of shielding members 90 are attached to the target rod outside of the segment sandwiched by the side burners 40 of the target rod 60 held by the chucks 30. Each shielding member 90 expands in the radial direction of the target rod 60 and separates the space around the target rod 60 into a segment outside and a segment inside the segment sandwiched by the side burners 40. In this way, the flow of the flame of the main burner 70 containing the glass microparticles is restricted from expanding farther outward than the side burners 40, and the glass microparticles generated by the main burner 70 are prevented from being attached to the target rod 60 in segments beyond the side burners 40.

The shape of each shielding member 90 may be circular with the target rod 60 as a center, or may be another shape such as elliptical or polygonal. The inner circumference of the shielding member 90 is preferably closely attached to the surface of the target rod 60.

Figure 2:
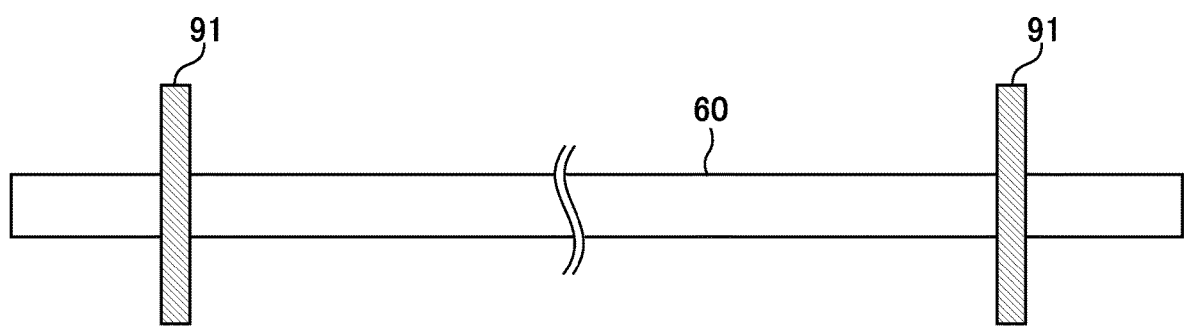
FIG. 2 is a schematic side view of an assembly including the carbon plate 91.

FIG. 2 is a schematic side view of an exemplary target rod 60 with a shielding member 90 attached thereto. The target rod 60 shown in the drawing has a pair of carbon plates 91 provided near the end portions thereof as the shielding members 90. When manufacturing the soot deposition body, the inside of the chamber 10 in the manufacturing apparatus 101 is filled with an inert gas such as nitrogen gas, and therefore the carbon plates 91 can be used as the shielding members 90 that have thermal resistance for resisting the flames of the side burners 40.

Figure 3:
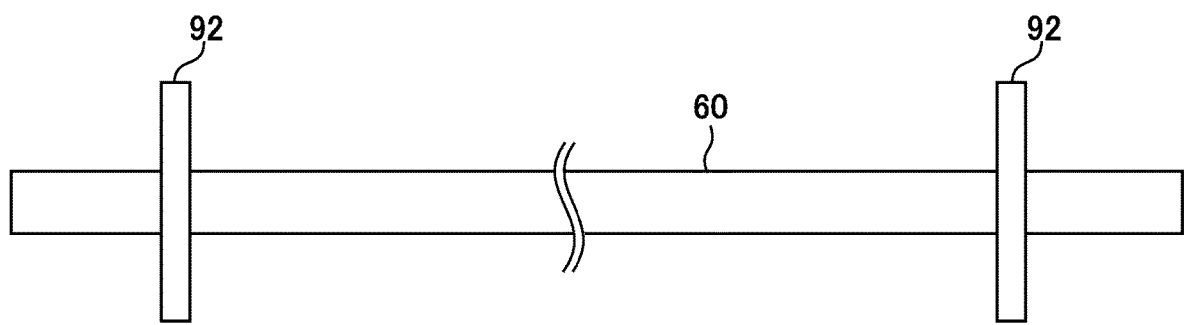
FIG. 3 is a schematic side view of an assembly including the quartz plate 92.

FIG. 3 is a schematic side view of an exemplary target rod 60 with other shielding members 90 attached thereto. The target rod 60 shown in the drawing has a pair of quartz plates 92 provided near the end portions thereof as the shielding members 90. By forming the shielding members 90 as the quartz plates 92, impurities do not occur inside the chamber 10 even when the flames of the side burners 40 are applied to the shielding members 90.

Figure 4:
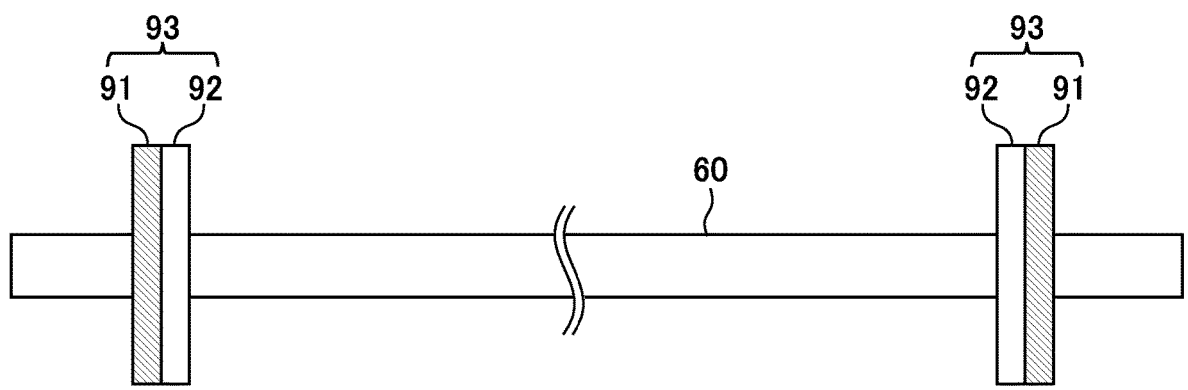
FIG. 4 is a schematic side view of an assembly including the composite plate 93.

FIG. 4 is a schematic side view of an exemplary target rod 60 with yet other shielding members 90 attached thereto. The target rod 60 shown in the drawing has composite plates 93, which are each formed by overlapping a carbon plate 91 and a quartz plate 92, provided near the end portions thereof as the shielding members 90. By forming the shielding members 90 as the composite plates 93, shielding members 90 can be obtained that realize the benefits of both the carbon plates 91 and the quartz plates 92.

In other words, carbon and quartz both share the characteristic of having excellent thermal resistance. With the carbon plates 91, machining such as creating holes is relatively easy and the shielding members 90 are easy to manufacture, but the carbon plates 91 are easily worn down when exposed directly to the flames of the burners. On the other hand, the quartz plates 92 are excellent with regard to thermal resistance and durability, but have inferior machining characteristics that cause an increase in the cost of the components of the shielding members 90. Therefore, by forming screw holes or the like by machining the carbon plates 91 while forming the portion to which the flames of the burners are applied with the quartz plates 92, it is possible to obtain shielding members 90 that utilize the benefits of each material.

As described above, the shielding members 90 can be formed with various materials and structures. However, it should be obvious that the materials and structures of the shielding members 90 are not limited to the examples described above.

Figure 5:
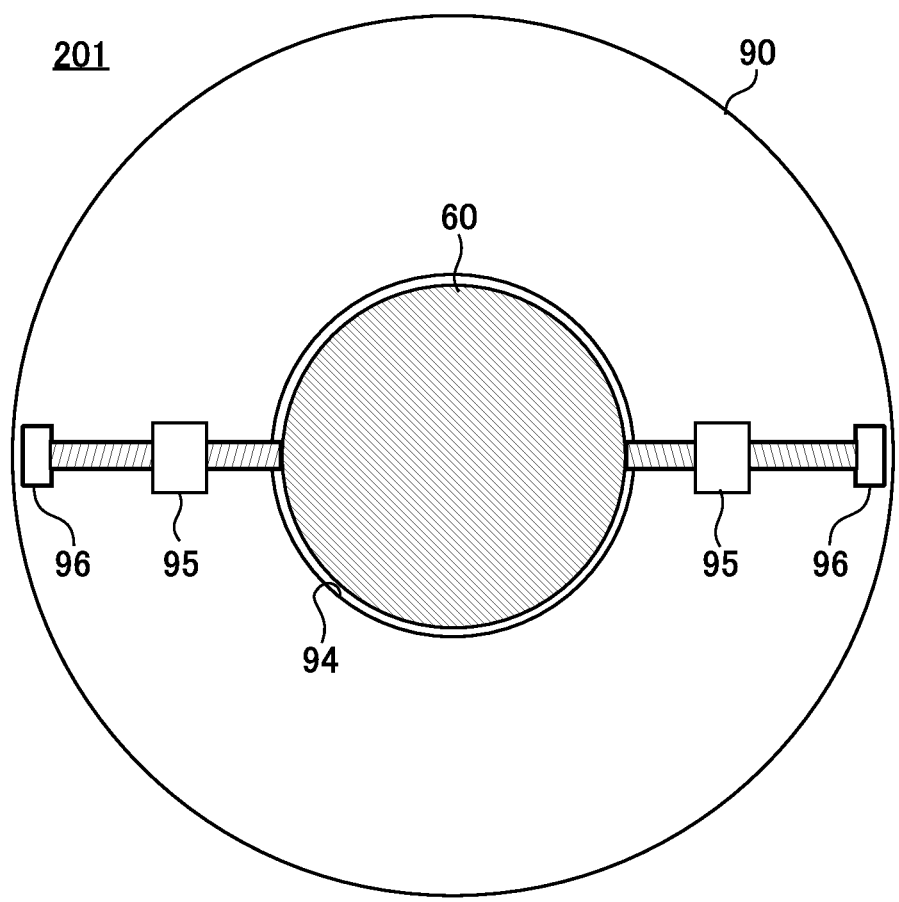
FIG. 5 is a schematic side view for describing a fixed structure of the shielding member assembly 201.

FIG. 5 shows an exemplary fixed structure in which a shielding member assembly 201 is fixed to the target rod 60. The shielding member assembly 201 in the drawing includes a shielding member 90, brackets 95, and screws 96.

The shielding member 90 is a circular plate with an insertion hole 94 in the center thereof. The inner diameter of the insertion hole 94 is slightly larger than the outer diameter of the target rod 60, and the target rod 60 can be inserted therethrough. The brackets 95 and the screws 96 are arranged symmetrically with respect to the center of the shielding member 90. The brackets 95 are fixed to the shielding member 90, and have screw holes with shapes that are complementary to the screws 96.

Each screw 96 is screwed into the corresponding bracket 95, and moves back and forth along one diameter of the shielding member 90. In this way, after the target rod 60 is inserted through the insertion hole 94 of the shielding member 90, the screws 96 are screwed in equally and the shielding member assembly 201 can be fixed to the target rod 60. In this way, the shielding member 90 is positioned relative to the target rod 60, and the target rod 60 with the shielding member assembly 201 attached thereto is loaded in the manufacturing apparatus 101, thereby making it possible to prevent glass microparticles from being deposited farther outward than the segment sandwiched by the side burners 40.

Figure 6:
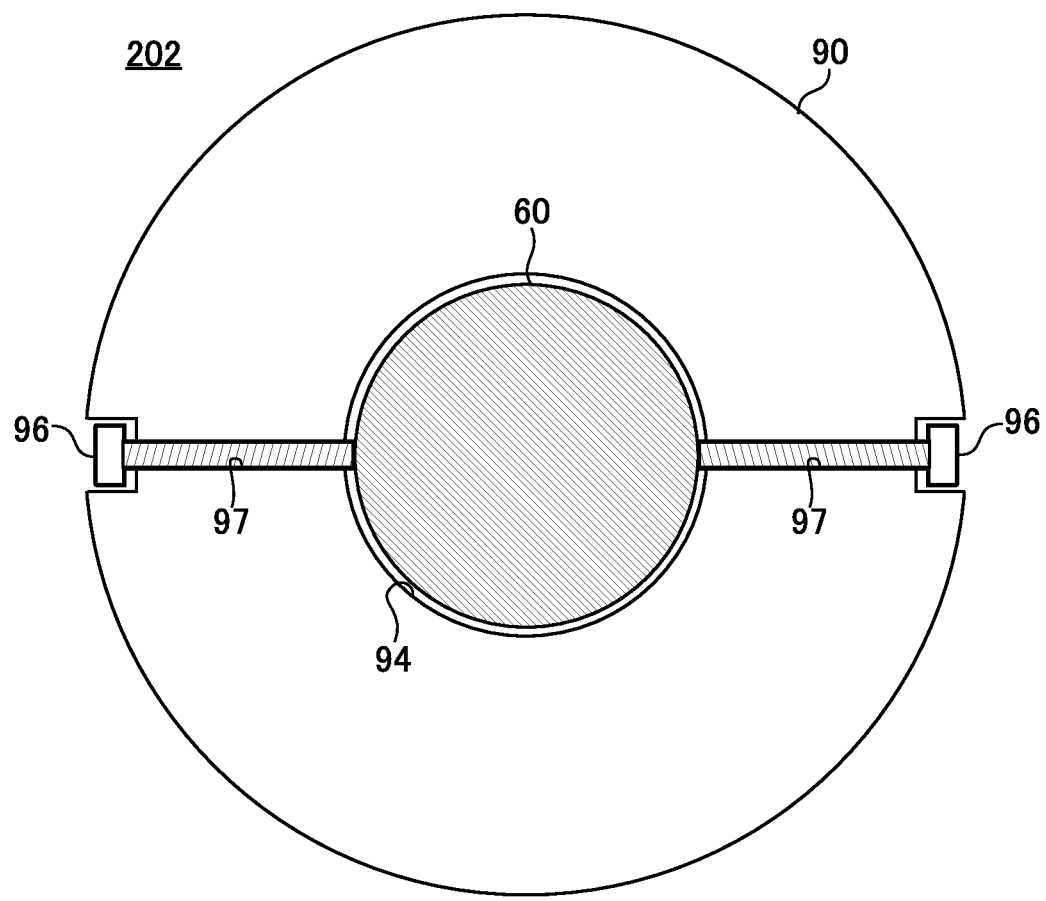
FIG. 6 is a schematic side view for describing another fixed structure of the shielding member assembly 202.

FIG. 6 shows a fixed structure in which another shielding member assembly 202 is fixed to the target rod 60. The shielding member assembly 202 shown in the drawing includes a shielding member 90 and screws 96.

The shielding member 90 is a circular plate with an insertion hole 94 in the center thereof. The inner diameter of the insertion hole 94 is slightly larger than the outer diameter of the target rod 60, and the target rod 60 can be inserted therethrough. The shielding member 90 has a pair of passage holes 97 that penetrate in the radial direction of the shielding member 90 from the outer circumference thereof to the inside of the insertion hole 94. The pair of passage holes 97 have screw threads on the inner surfaces thereof that are complementary to the screws 96, and are formed along one diameter of the shielding member 90.

The screws 96 are screwed into the passage hole 97 from the outer circumference side of the shielding member 90, and the tip of each screw 96 protrudes to the inside of the insertion hole 94. Accordingly, after the target rod 60 is inserted into the insertion hole 94 of the shielding member 90, the screws 96 are screwed in equally and the shielding member assembly 202 can be fixed to the target rod 60. Furthermore, the target rod 60 with the shielding member assembly 202 attached thereto near both ends is loaded in the manufacturing apparatus 101, thereby making it possible to prevent glass microparticles from being deposited farther outward than the segment sandwiched by the side burners 40.

Figure 7:
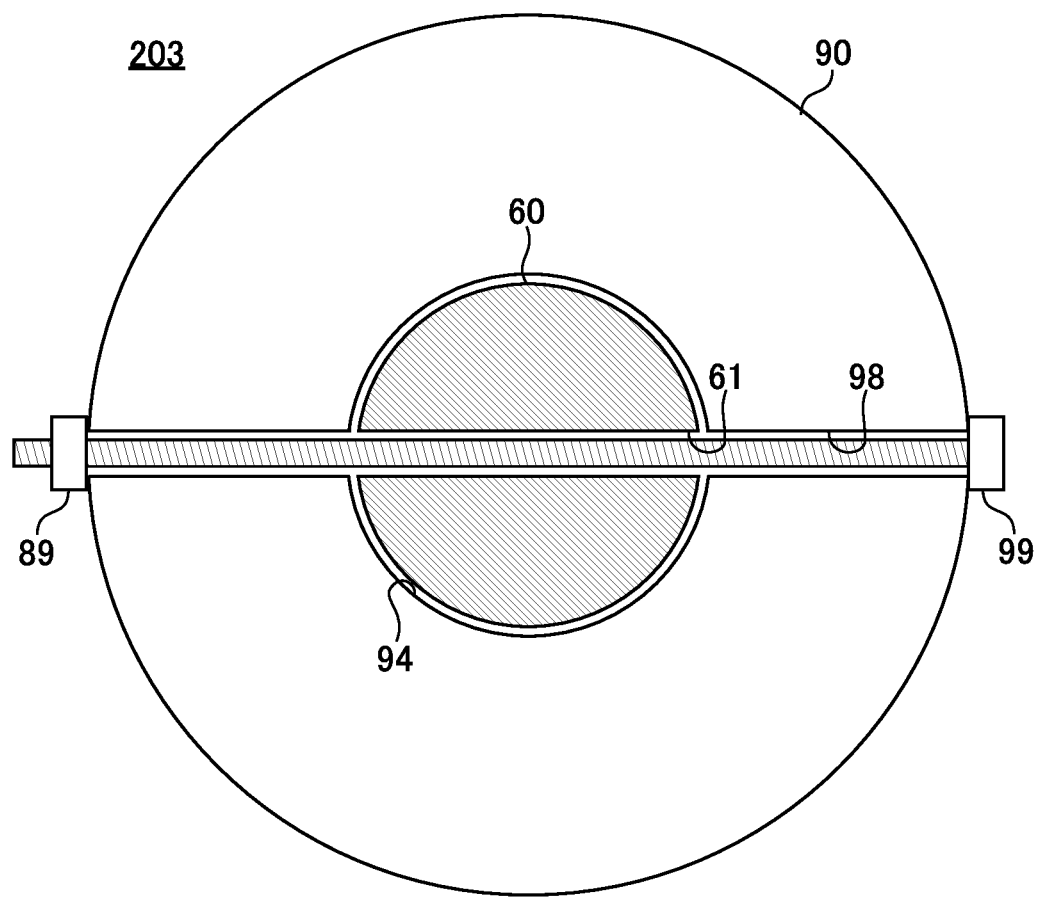
FIG. 7 is a schematic side view for describing another fixed structure of the shielding member assembly 203.

FIG. 7 shows a fixed structure in which another shielding member assembly 203 is fixed to the target rod 60. The shielding member assembly 203 shown in the drawing includes a shielding member 90, a bolt 99, and a nut 89.

The shielding member 90 shown in the drawings has a pair of through-holes 98 that penetrate in the radial direction from the outer circumferential surface to the inside of the insertion hole 94. The screw thread on the inner wall of the through-hole 98 is not severed, and therefore the machining for forming the through-hole 98 is easy. The through-hole 98 is formed along one diameter of the circular shielding member 90.

When this shielding member assembly 203 is used, a through-hole 61 penetrating in the radial direction is also formed in the target rod 60. The target rod 60 is inserted into the insertion hole 94 of the shielding member 90 and, in a state where the through-hole 98 of the shielding member 90 and the through-hole 61 of the target rod 60 are aligned on a single straight line, the bolt 99 is inserted through the through-holes 98 and 61.

Here, the length of the bolt 99 is greater than the outer diameter of the shielding member 90. Accordingly, the tip of the bolt 99 inserted through the through-hole 98 and the through-hole 61 protrudes to the outside in the radial direction from the side surface of the shielding member 90. By engaging the nut 89 on the protruding portion of the bolt 99 and screwing the nut 89 on, the shielding member 90 can be positioned relative to the target rod 60. In this way, target rod 60 with the shielding member assembly 201 attached thereto is loaded in the manufacturing apparatus 101, and it is possible to prevent glass microparticles from being deposited farther outward than the segment sandwiched by the side burners 40.

As described above, the shielding member 90 can be fixed to the target rod 60 with a variety of methods. However, the fixed structure and arrangement of the shielding member 90 are not limited to the example described above. In other words, the shielding member 90 only needs to be fixed at a position that enables the flame including the glass microparticles generated by the main burner 70 to be prevented from expanding farther outward than the segment sandwiched by the side burners 40 in the target rod 60. Accordingly, as long as the position relative to the target rod 60 held by the chucks 30 in the manufacturing apparatus 101 is unchanged, the shielding member 90 may be coupled and fixed to components other than the target rod 60. Accordingly, the shielding member 90 may be fixed to a component supporting the side burners 40, an inner surface of the chamber 10, or the like, for example.

Figure 8:
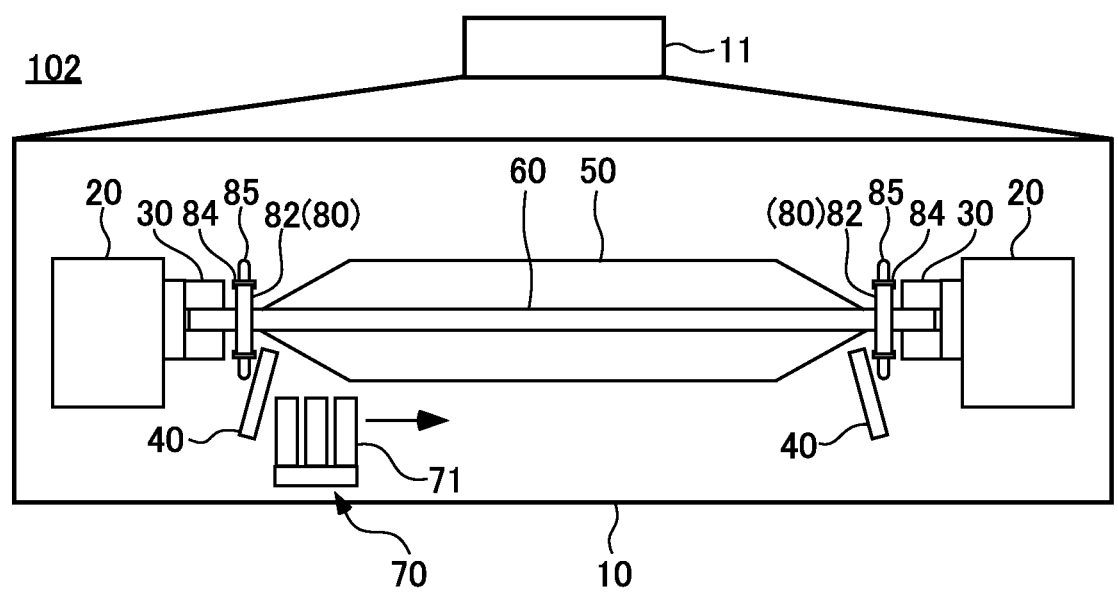
FIG. 8 is a schematic vertical cross-sectional view of another manufacturing apparatus 102.

FIG. 8 is a schematic cross-sectional view of another manufacturing apparatus 102, shown from the same viewpoint as in FIG. 1. The manufacturing apparatus 102 has the same structure as the manufacturing apparatus 102 shown in FIG. 1, aside from the portions described below. Accordingly, components common to both are given the same reference numerals and redundant descriptions are omitted.

In the manufacturing apparatus 102, the shielding members 80 include semi-circular plates 82 and are connected to other semi-circular plates 81 having leg portions 85 (see FIG. 9) with clamps 84. The end portions of the leg portions 85 are fixed to the chamber 10 of the manufacturing apparatus 102.

Figure 9:
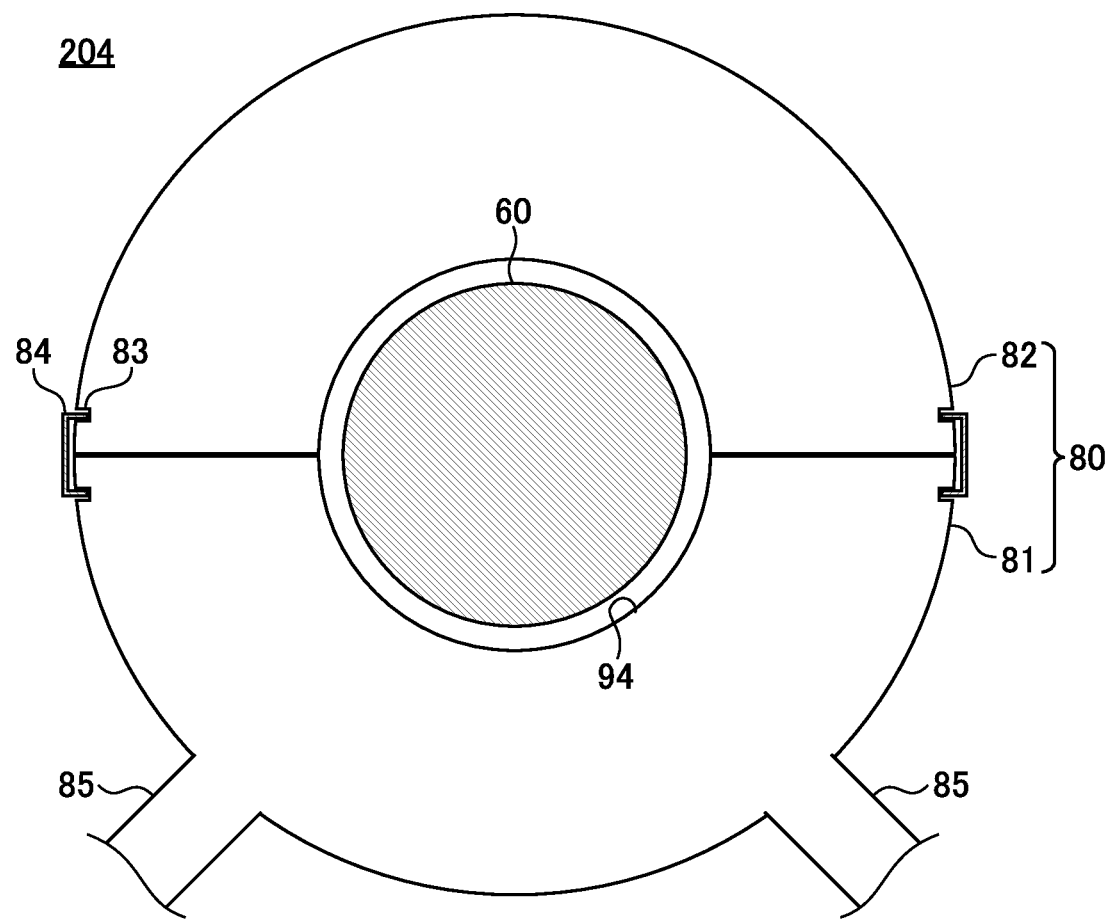
FIG. 9 is a schematic side view for describing another fixed structure of the shielding member assembly 203.

FIG. 9 shows a form of a shielding member assembly 204 including a shielding member 80 in the manufacturing apparatus 102. The shielding member assembly 204 includes the shielding member 80 and a pair of clamps 84.

The semi-circular plates 81 and 82 divide the shielding member 80, which has an overall circular shape, into top and bottom portions in the drawing. In the side portion of the shielding member 80 in the drawing, a groove 83 extending in the depth direction of the plane of the drawing is formed in each of the semi-circular plates 81 and 82. Furthermore, in each central portion of the shielding member 80 in the drawing, the end portion of a clamp 84 is fit into the groove 83. In this way, the semi-circular plates 81 and 82 form a single shielding member 80 with a circular shape.

The shielding member 80 includes the insertion hole 94 in the center thereof. The inner diameter of the insertion hole 94 is slightly larger than the outer diameter of the target rod 60, and the target rod 60 can be inserted into the insertion hole 94 of the target rod 60 without touching the inner sides.

The semi-circular plate 81 on the bottom portion in the drawing that forms the shielding member 80 includes a pair of leg portions 85 formed integrally and extending downward in the drawing. The bottom ends of the leg portions 85, which are not shown in the drawing, are fixed to the bottom portion of the chamber 10 in the manufacturing apparatus 102 shown in FIG. 8, and position the semi-circular plate 81. Accordingly, the shielding member 80 formed having the semi-circular plate 82 on the top side connected to the semi-circular plate 81 on the bottom side is also positioned relative to the chamber 10 of the manufacturing apparatus 102.

Furthermore, by releasing the clamps 84 in the shielding member 80, the semi-circular plate 82 on the top side can be separated from the semi-circular plate 81 on the bottom side. When the semi-circular plates 81 and 82 are separated from each other, since the top half of the insertion hole 94 in the drawing is released, the target rod 60 can be inserted to the inside of the insertion hole 94 from the side of the shielding member 80. In this way, the target rod 60 can be attached and removed in the manufacturing apparatus 102 in which the shielding member 80 is positioned relative to the chamber 10.

With reference to FIG. 8 again, the end portion of the target rod 60 is shielded from the main burner 70 by the shielding member 80 positioned near the end portions of the target rod 60 loaded in the manufacturing apparatus 102. Accordingly, it is possible to prevent glass microparticles from being deposited farther outward than the segment sandwiched by the side burners 40 in the target rod 60.

Figure 10:
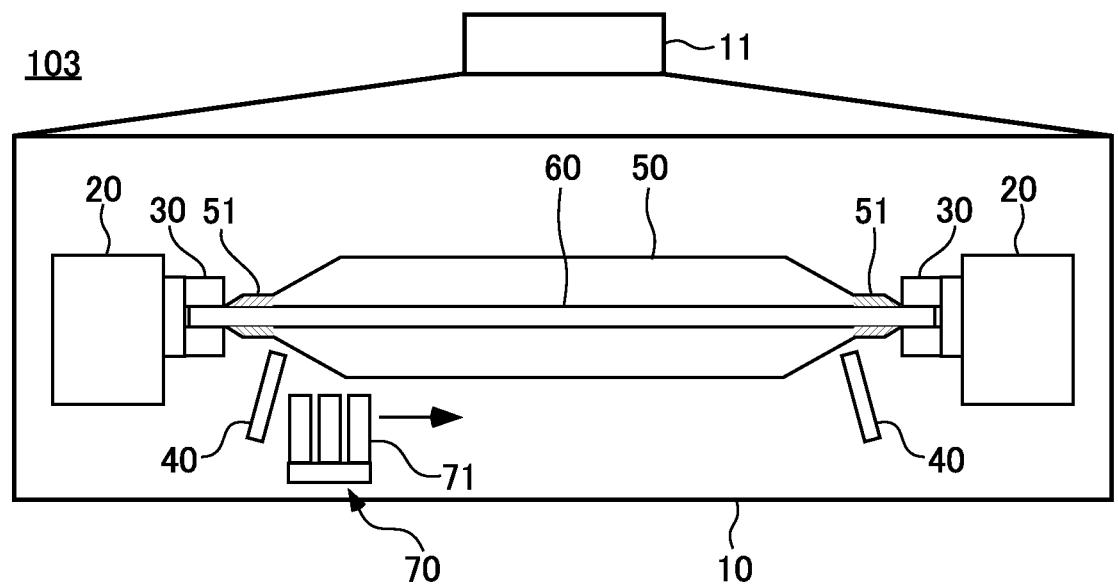
FIG. 10 is a schematic vertical cross-sectional view of another manufacturing apparatus 103.

FIG. 10 is a schematic vertical cross-sectional view of manufacturing apparatus 103 serving as a comparative example, from the same viewpoint as in FIG. 1. In order to be compared to the manufacturing apparatus 101 that is an embodiment, the manufacturing apparatus 103 has the same structure as the manufacturing apparatus 101 shown in FIG. 1, aside from not including the shielding members 90.

Accordingly, elements common to both are given the same reference numerals and redundant descriptions are omitted.

The manufacturing apparatus 103 does not include the shielding members 90. Therefore, when the main burner 70 moves to an end of the movement range in the process for forming the soot deposition body 50, there are cases where a portion of the flame emitted from the main burner 70 expands farther outward than the segment of the target rod 60 sandwiched by the side burners 40. As a result, a portion of the glass microparticles generated in the flame attach to the target rod 60 at a region closer to the end portion of the target rod 60 than the side burner 40.

As described above, the glass microparticles that are attached near the end portion of the target rod 60 are not fired by the flame of the side burner 40, and become a low-density soot deposition body 51 with low density. The low-density soot deposition body 51 itself has low density, and therefore has weak attachment force with respect to the target rod 60, and soot peeling occurs when the deposition amount is increased and the mass becomes greater.

In this way, when the shielding members 90 are removed, the low-density soot deposition body 51 is formed in regions where firing is not applied by the side burners 40, and there is a decrease in the yield of soot deposition bodies that can be used as optical fiber base material after the vitrification process through sintering. In other words, it is possible to improve the producibility of the optical fiber base material by arranging the shielding members 90 on the end portions of the target rod 60 relative to the side burners 40 to prevent the formation of the low-density soot deposition bodies 51 closer to the end portions of the target rod 60 than the side burners 40.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: chamber, 11: exhaust outlet, 20: rotating mechanism, 30: chuck, 40: side burner, 50: soot deposition body, 51: low-density soot deposition body, 60: target rod, 61, 98: through-hole, 70: main burner, 71: deposition burner, 80, 90: shielding member, 81, 82: semi-circular plate, 83: groove, 84: clamp, 85: leg portion, 89: nut, 91: carbon plate, 92: quartz plate, 93: composite plate, 94: insertion hole, 95: bracket, 96: screw, 97: passage hole, 99: bolt, 101, 102, 103: manufacturing apparatus, 201, 202, 203, 204: shielding member assembly

What is claimed is:

1. A manufacturing apparatus for manufacturing an optical fiber base material by forming a soot deposition body on a surface of a target rod, comprising:
   a pair of holding members that hold both ends of the target rod;
   a main burner that generates glass microparticles to be deposited on the target rod while moving in a longitudinal direction of the target rod;
   a pair of side burners that are arranged outside a movement range of the main burner and heat both ends of the soot deposition body formed on the surface of the target rod; and
   a shielding member that prevents the glass microparticles generated by the main burner from being deposited on the target rod farther outward than a segment of the target rod sandwiched by the pair of side burners such that a flow of a flame of the main burner containing the glass microparticles is restricted from expanding farther outward than the pair of side burners, wherein
   the shielding member is provided at a overlapped position with the pair of side burners in the longitudinal direction of the target rod, and
   the shielding member is provided at a overlapped position with the pair of side burners in a direction that is perpendicular to the longitudinal direction of the target rod.

2. The manufacturing apparatus according to claim 1, wherein
   the shielding member is fixed to the target rod.

3. The manufacturing apparatus according to claim 1, wherein
   the shielding member is fixed to a chamber housing the target rod.

4. The manufacturing apparatus according to claim 1, wherein
   the shielding member is a plate with a surface expanding in a radial direction of the target rod.

5. The manufacturing apparatus according to claim 4, wherein
   the shielding member includes at least one of a carbon plate and a quartz plate.

6. The manufacturing apparatus according to claim 5, wherein
   the shielding member includes the carbon plate and the quartz plate.

7. A manufacturing method for manufacturing an optical fiber base material by forming a soot deposition body on a surface of a target rod, comprising:
   holding both ends of the target rod with a pair of holding members;
   depositing glass microparticles on the target rod by moving a main burner that generates the glass microparticles in a longitudinal direction of the target rod; and
   heating both ends of the soot deposition body formed on the surface of the target rod with a pair of side burners that are arranged outside a movement range of the main burner, wherein
   a shielding member prevents the glass microparticles generated by the main burner from being deposited on the target rod farther outward than a segment of the target rod sandwiched by the pair of side burners such that a flow of a flame of the main burner containing the glass microparticles is restricted from expanding farther outward than the pair of side burners, and
   the shielding member is provided at a overlapped position with the pair of side burners in the longitudinal direction of the target rod, and
   the shielding member is provided at a overlapped position with the pair of side burners in a direction that is perpendicular to the longitudinal direction of the target rod.

8. A shielding member that is arranged in a manufacturing apparatus, which is for manufacturing optical fiber base material by holding both ends of a target rod with a pair of holding members and forming a soot deposition body on a surface of the target rod, outside of a movement range of a main burner that generates glass microparticles to be deposited on the target rod, and prevents the glass microparticles from being deposited on the target rod farther outward than a segment of the target rod sandwiched by a pair of side burners that heat both ends of the soot deposition body formed on the surface of the target rod such that a flow of a flame of the main burner containing the glass microparticles is restricted from expanding farther outward than the pair of side burners, wherein
   the shielding member is provided at a overlapped position with the pair of side burners in the longitudinal direction of the target rod, and
   the shielding member is provided at a overlapped position with the pair of side burners in a direction that is perpendicular to the longitudinal direction of the target rod.

9. A manufacturing apparatus for manufacturing an optical fiber base material by forming a soot deposition body on a surface of a target rod, comprising:
   a main burner that generates glass microparticles to be deposited on the target rod while moving in a longitudinal direction of the target rod;
   a pair of side burners that are arranged outside a movement range of the main burner and heat both ends of the soot deposition body formed on the surface of the target rod; and
   a shielding member that prevents the glass microparticles generated by the main burner from being deposited on the target rod farther outward than a segment of the target rod sandwiched by the pair of side burners such that a flow of a flame of the main burner containing the glass microparticles is restricted from expanding farther outward than the pair of side burners, wherein
   the shielding member has a first divided plate and a second divided plate.

10. The manufacturing apparatus according to claim 9, wherein the first divided plate and the second divided plate are coupled via a pair of clamps such that the first divided plate and the second divided plate form a single shielding member with a circular shape.

11. The manufacturing apparatus according to claim 10, wherein the first divided plate and the second divided plate are semi-circular plates.

12. The manufacturing apparatus according to claim 10, wherein the second divided plate has a pair of leg portions fixed to a chamber housing the target rod.

13. The manufacturing apparatus according to claim 12, wherein the first divided plate does not have a pair of leg portions fixed to a chamber housing the target rod.

* * * * *